(12) United States Patent
Hartman et al.

(10) Patent No.: US 10,979,468 B2
(45) Date of Patent: *Apr. 13, 2021

(54) LIMITING KEY REQUEST RATES FOR STREAMING MEDIA

(71) Applicant: Brightcove Inc., Boston, MA (US)

(72) Inventors: Barry Hartman, San Francisco, CA (US); Sean Knapp, Mountain View, CA (US); Bob Sesek, Sunnyvale, CA (US); Siddharth Gopalan, Harrison, NJ (US)

(73) Assignee: Brightcove Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,719

(22) Filed: Aug. 21, 2019

(65) Prior Publication Data

US 2019/0379716 A1    Dec. 12, 2019

Related U.S. Application Data

(63) Continuation of application No. 15/169,543, filed on May 31, 2016, now Pat. No. 10,432,685.

(51) Int. Cl.
*G06F 15/16* (2006.01)
*H04L 29/06* (2006.01)
(Continued)

(52) U.S. Cl.
CPC ............ *H04L 65/60* (2013.01); *G06F 21/105* (2013.01); *H04L 9/14* (2013.01); *H04L 63/0428* (2013.01);
(Continued)

(58) Field of Classification Search
CPC ... H04L 65/60; H04L 65/4084; H04L 65/607; H04L 65/602; H04L 9/14; H04L 63/0428; H04L 67/02; H04L 2209/60; H04N 21/2347; H04N 21/2541; H04N 21/25875; H04N 21/26258; H04N 21/26613; H04N 21/4405; H04N 21/47202; H04N 21/63345; H04N 21/8456
(Continued)

(56) References Cited

U.S. PATENT DOCUMENTS 6,629,243 B1    9/2003    Kleinman et al.
7,698,392 B2 *  4/2010    Zapata ................ H04L 43/0811
                                                709/220
(Continued)

OTHER PUBLICATIONS

U.S. Appl. No. 15/169,543 , "Final Office Action", dated Mar. 19, 2019, 15 pages.

*Primary Examiner* — Thu Ha T Nguyen
(74) *Attorney, Agent, or Firm* — Kilpatrick Townsend & Stockton, LLP

(57) ABSTRACT

Techniques and a system are provided for protecting content (or media item) streamed over a network from unauthorized access. As an example, the streaming protection system generates statistics when a client requests a media item. The statistic may be generated based on various factors. The media item is divided into different portions, each portion requiring a different key to decrypt the portion so that it may be viewed by a user. Based on the generated statistic, the streaming protection system determines whether or not to allow the client access to the decryption key for a portion of the media item.

20 Claims, 6 Drawing Sheets

(51) Int. Cl.

| | |
|---|---|
| *H04L 9/14* | (2006.01) |
| *G06F 21/10* | (2013.01) |
| *H04N 21/254* | (2011.01) |
| *H04N 21/266* | (2011.01) |
| *H04N 21/2347* | (2011.01) |
| *H04N 21/4405* | (2011.01) |
| *H04N 21/258* | (2011.01) |
| *H04N 21/262* | (2011.01) |
| *H04N 21/472* | (2011.01) |
| *H04N 21/6334* | (2011.01) |
| *H04N 21/845* | (2011.01) |
| *H04L 29/08* | (2006.01) |

(52) U.S. Cl.
CPC ........ *H04L 65/4084* (2013.01); *H04L 65/602* (2013.01); *H04L 65/607* (2013.01); *H04N 21/2347* (2013.01); *H04N 21/2541* (2013.01); *H04N 21/25875* (2013.01); *H04N 21/26258* (2013.01); *H04N 21/26613* (2013.01); *H04N 21/4405* (2013.01); *H04N 21/47202* (2013.01); *H04N 21/63345* (2013.01); *H04N 21/8456* (2013.01); *H04L 67/02* (2013.01); *H04L 2209/60* (2013.01)

(58) Field of Classification Search
USPC .............................. 709/219, 218, 220, 217
See application file for complete search history.

(56) References Cited

U.S. PATENT DOCUMENTS

| | | | |
|---|---|---|---|
| 7,933,410 B2 | 4/2011 | Fahrny | |
| 8,280,863 B2 | 10/2012 | Pantos et al. | |
| 8,301,570 B2 * | 10/2012 | Sathyan | H04L 63/0478 705/56 |
| 8,301,725 B2 | 10/2012 | Biderman et al. | |
| 8,627,081 B2 | 1/2014 | Grimen et al. | |
| 9,385,999 B2 | 7/2016 | Kanungo | |
| 9,426,139 B1 | 8/2016 | McClintock et al. | |
| 9,503,451 B1 | 11/2016 | Kane-Parry et al. | |
| 9,824,207 B1 | 11/2017 | Kane-Parry et al. | |
| 9,838,384 B1 | 12/2017 | Kane-Parry et al. | |
| 10,432,685 B2 | 10/2019 | Hartman et al. | |
| 2003/0059053 A1 * | 3/2003 | Medvinsky | H04L 63/062 380/277 |
| 2003/0229900 A1 | 12/2003 | Reisman | |
| 2004/0083184 A1 | 4/2004 | Tsuei et al. | |
| 2004/0091116 A1 * | 5/2004 | Staddon | G06Q 20/3829 380/277 |
| 2004/0103066 A1 | 5/2004 | Staddon et al. | |
| 2004/0105549 A1 | 6/2004 | Suzuki et al. | |
| 2004/0139336 A1 | 7/2004 | Mclean et al. | |
| 2004/0221287 A1 * | 11/2004 | Walmsley | G06F 21/554 718/100 |
| 2004/0260653 A1 | 12/2004 | Tsuei et al. | |
| 2005/0265555 A1 | 12/2005 | Pippuri | |
| 2006/0259637 A1 | 11/2006 | Yadav et al. | |
| 2007/0127650 A1 | 6/2007 | Altberg et al. | |
| 2007/0250901 A1 * | 10/2007 | McIntire | H04N 21/8586 725/146 |
| 2010/0250704 A1 | 9/2010 | Kittel | |
| 2011/0246623 A1 * | 10/2011 | Pantos | H04L 65/608 709/219 |
| 2011/0252118 A1 * | 10/2011 | Pantos | G06F 21/0484 709/219 |
| 2012/0189000 A1 * | 7/2012 | Rahman | H04L 65/1026 370/352 |
| 2012/0246462 A1 | 9/2012 | Moroney et al. | |
| 2012/0271922 A1 * | 10/2012 | Assouline | H04L 69/165 709/219 |
| 2012/0323717 A1 | 12/2012 | Kirsch | |
| 2013/0080267 A1 | 3/2013 | McGowan | |
| 2013/0080772 A1 | 3/2013 | McGowan | |
| 2013/0219178 A1 | 8/2013 | Xiques et al. | |
| 2013/0238896 A1 * | 9/2013 | Pedlow, Jr. | G06F 21/335 713/156 |
| 2013/0311780 A1 | 11/2013 | Besehanic | |
| 2014/0066014 A1 | 3/2014 | Nicholson et al. | |
| 2014/0173061 A1 * | 6/2014 | Lipstone | H04L 61/10 709/220 |
| 2014/0310779 A1 * | 10/2014 | Lof | G06F 21/6254 726/4 |
| 2015/0195278 A1 | 7/2015 | Plotkin et al. | |
| 2016/0255139 A1 * | 9/2016 | Rathod | H04L 51/046 709/203 |
| 2016/0337426 A1 * | 11/2016 | Shribman | H04L 65/608 |
| 2016/0344561 A1 | 11/2016 | Grajek | |
| 2016/0366118 A1 | 12/2016 | Wang | |
| 2016/0371787 A1 * | 12/2016 | Rackley | G06Q 10/105 |
| 2017/0034160 A1 | 2/2017 | Brands et al. | |
| 2017/0171231 A1 * | 6/2017 | Reybok, Jr. | G06F 16/23 |
| 2017/0346865 A1 | 11/2017 | Hartman et al. | |
| 2018/0302452 A1 | 10/2018 | Pantos et al. | |
| 2019/0261034 A1 * | 8/2019 | Gordon | H04N 21/20 |
| 2019/0306164 A1 * | 10/2019 | Brands | H04L 9/3228 |
| 2020/0068256 A1 * | 2/2020 | Gordon | H04N 21/8133 |
| 2020/0104731 A1 * | 4/2020 | Oliner | G06F 16/245 |

* cited by examiner

LIMITING KEY REQUEST RATES FOR STREAMING MEDIA

CROSS-REFERENCES TO RELATED APPLICATIONS

This application is a continuation of U.S. patent application Ser. No. 15/169,543, filed May 31, 2016, entitled "LIMITING KEY REQUEST RATES FOR STREAMING MEDIA," the entire contents of which are herein incorporated by reference.

TECHNICAL FIELD

The present disclosure relates to the streaming transmission of media items and, more particularly, to methods and systems to control access to streaming media items.

BACKGROUND OF THE INVENTION

The Internet has allowed customers to connect with content providers in ways that previously did not exist. This has been a boon to both parties. For one, customers now have access to a wide variety of media items and content they may otherwise not find (e.g., television shows, movies, news and various categories of video) produced for delivery over the Internet. Content owners and distributors have a variety of methods available to enable consumers to view this video content. Linear video of either pre-recorded video or of live events that are now being streamed using the Internet, enabling consumers to watch the same video that may be playing on pay TV networks (cable, satellite, telco). With video on demand (VOD), customers may view media items at any time, and on any day, without worrying about any broadcast schedule. For example, for broadcast television shows, the shows may be available on VOD before, simultaneously, or after the initial broadcast date. Also, VOD may be available to stream direct to their device or may be available for download, which enables viewing while being downloaded or playback at a later time.

Different content providers use different models to generate revenue for their VOD streaming, VOD download, or linear streaming content. Some possible models include revenue from subscription fees, advertisement placement fees, rental fees, purchasing fees, or any combination of these. For any revenue model that involves obtaining revenue from viewers, content providers need to control who is able to view their media items.

Unauthorized Access

Although content providers want to provide a system that is as accessible and as easy-to-use as possible, they need to balance that desire with protecting media items from misuse. Misuse does not necessarily need to be from hackers who purposefully seek to break the content distributor's system. Misuse is perpetrated by anyone who circumvents restrictions on access to content. For example, while an authorized user may be allowed to view a piece of content for their personal consumption, they may be contractually prohibited from sharing their access to view the piece of content with others.

There are a variety of methods unauthorized users may use to obtain unauthorized access to VOD streaming, VOD download and liner streaming media items. One example is through using deep linking. Deep linking refers to accessing a video directly using the absolute or resolved URL of the VOD file (for streaming or download) or live stream, rather than through the published, publicly available relative URL. The relative URL is resolved to an absolute or resolved URL after performing any configured entitlement checks for each use of the relative URL. By using the deep link, users can bypass restrictions built into the system, such as requiring login information for authentication before the user is authorized to use the resolved URL.

Another method for unauthorized users to view a media item is to obtain access to an authorized user's authentication credentials, and to use those credentials to access the media item. By using the authorized user's credentials, an unauthorized user may access VOD streaming, VOD download or liner streaming media item as the authorized user. Using an authorized user's credentials has the limitation that, because authentication may expire, unauthorized access is possible only between the time that the credentials are acquired, and the time when the authorized user's authorization expires. However, in some cases, that period is long enough to satisfy the unauthorized users' intentions.

Linear Streaming

Linear streaming may include content captured from a camera and streamed with minimal delay, pre-recorded content transcoded into a linear stream, or a single stream that switches source between live camera feed and pre-recorded files.

Techniques to Prevent Unauthorized Access

There are different methods and techniques to protect media items, including digital rights management, and the use of certain encrypted streaming protocols. With respect to digital rights management (DRM), DRM cryptographically binds playback of an encrypted stream to an authenticated device, which prevents unauthorized access to media items on a device level. So, unless a user's device includes the right device signature, access to a media item is disallowed.

In a DRM, there are various technical requirements to ensure conformance with a DRM standard. One such component is a requirement that a client piece, that decrypts and plays back media items, is very robust. Being robust means that the client includes a client component that is hard for hackers to get into. One way DRM does this is by using encryption to encrypt a device's signature. The device's signature is prevented from being accessed by the application layer. For example, for other applications installed on the device, they are unable to access the device's signature. The ability to decrypt the encrypted stream is possible by a robust DRM client that has access to the device signature. This means that other applications running on the same device or another device are unable to decrypt the encrypted stream for playback.

However, DRM systems have drawbacks. For example, DRMs are often device specific. For the DRM component that resides on a client computer, it has to be specifically designed for each operating environment (e.g., different operating system, different client software, different device types).

Further, DRMs impose development, deployment, and royalty costs. There may be intense computation demands on a backend server of a DRM system, to get client devices properly setup to view DRM-protected media items. Particularly for linear streams of live events, there may be many requests from many different clients, to register their devices to view a particular linear stream within a short window of time. Many requests result in a key "storm;" where a DRM server is inundated with many requests to authenticate and secure client devices. When the DRM server is inundated it may cause performance or other issues.

Another method used to protect media items is to use encryption built into different streaming techniques (or streaming protocols). Some examples of streaming and encryption techniques that may be used with the system include Dynamic Adaptive Streaming over HTTP with Common Encryption (MPEG-DASH CE), Apple Inc.'s encrypted HTTP Live Streaming (eHLS), protected HTTP DYNAMIC STREAMING (PHDS) by Adobe Systems Incorporated, or Microsoft Inc.'s encrypted SMOOTH STREAMING. These streaming techniques offer some protection against unauthorized access by encrypting the video stream or file.

These streaming techniques use a manifest, which includes a listing of key-manager-addresses (e.g. URLs) to which to send requests for keys to decrypt encrypted portions of a media item.

Prior to viewing each portion, the client sends a request to a key-manager-address to obtain a content encryption key (CEK) for the portion. Having obtained the CEK for the portion, the client uses the CEK to decrypt that portion as the portion is streamed to the client. An encrypted area holding the device identifier is not necessary in this situation.

FIG. 1 shows an example of a content stream 100 for a media item. Streams may include a series of small files, each including a portion of the streamed content. FIG. 1 shows portions 1, 2, 3, to n, where n is the total number of portions a stream is divided into. A manifest is included with the content stream, which identifies where a key may be obtained to decrypt each portion of the content stream. Each portion in a media item may be referenced by an offset. For example, the offset for portion 1 indicates that it is the start of the media item. Another offset for portion 2 indicates that it comes chronologically in the media item after portion 1. Depending on a length and size of each portion, the number of portions for each media item can be greater or smaller. As discussed in greater detail hereafter, each portion of the content stream may be encrypted and requires decryption before it can be viewed. Decryption occurs seamlessly, so that a user may view a single media item, spanning multiple portions, as if only one single portion existed for the media item.

In some implementations of encrypted video security, the video manifest associated with the content stream (both VOD and linear) indicates how to request the CEK for each portion. Key-manager-addresses in the manifest may be represented by universal resource locators (URLs). URLs provide a key-manager-address (or reference, or address) to which requests for CEKs should be sent. For example, the manifest may indicate that the CEK for portion 1 may be retrieved by a client device by sending a request to a first key-manager-address. One example of a manifest file is a M3U8 file used for HLS. A client device with the manifest will request the keys from a key manager located at the key-manager-addresses specified by the manifest. With these keys, the client decrypts the portions of the media item as the media item is streamed for playback on the client.

However, streaming techniques using only encryption with the key server referenced in the manifest may be less secure than systems implementing DRM technologies. While an initial access to the manifest may be restricted (e.g. by requiring logon or other user authentication to access the manifest), once the manifest is released, there is no control over who may use it. For example, once a manifest is obtained (e.g., after user authentication), it is possible to republish the manifest, to allow other users to access and decrypt the corresponding media item. Specifically, these other users would then be able to use the authorized user's user identifier to request keys from a key manager at the key-manager-address specified by the manifest.

Content distributors see the authorized user's identifier that accompanies requests, and assume that the requests come from the authorized user. Since content distributors do not know who the requests actually come from, the request will be fulfilled based on the authorized user's identifier, thus allowing the unauthorized viewers to use the republished manifest to decrypt portions of the media item.

Therefore, there is a need to reach a balance between allowing legitimate access to content and preventing illegitimate access.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
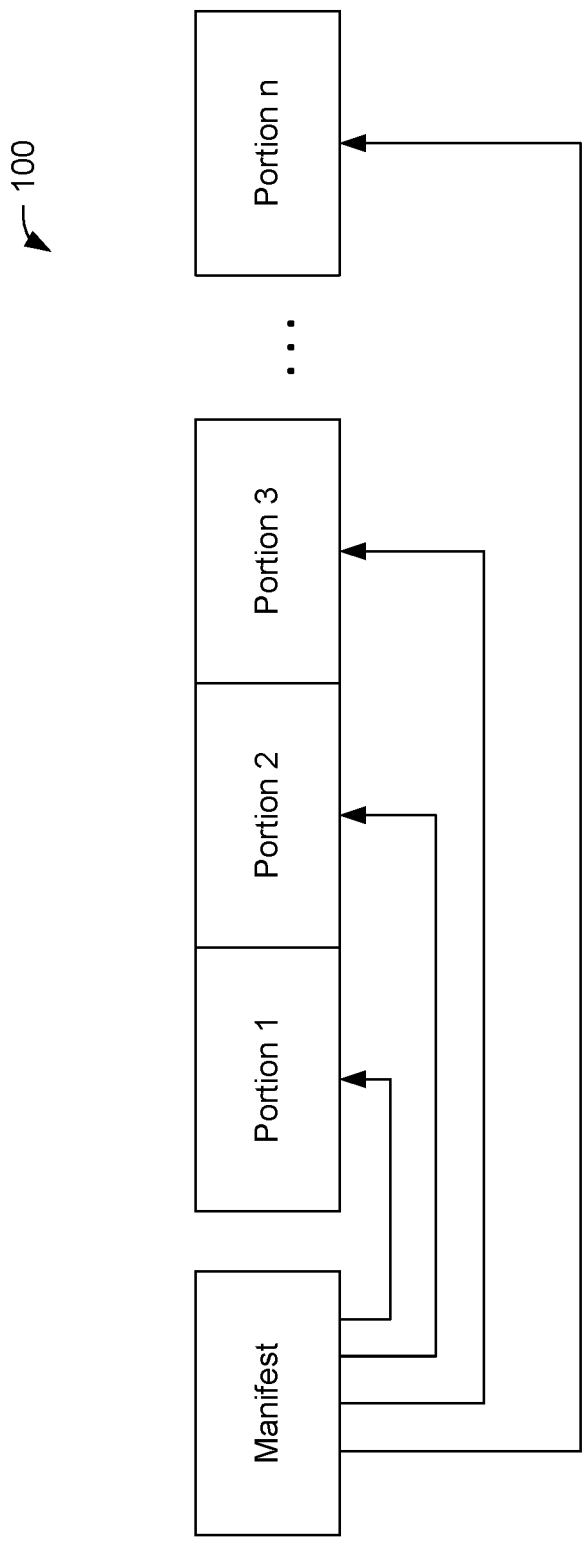
FIG. 1 shows an example of a content stream for a media item.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A streaming protection system is described herein which implements techniques for protecting, from unauthorized access, content streamed over a network. As used herein, "media item" refers to a specific piece of content. The streaming protection system helps detect illegitimate requests for a media item by detecting when legitimate-appearing requests for the media item have exceeded a threshold.

As an example, the streaming protection system generates statistics when a client requests a media item, such as when a user makes a request for the media item on a video on demand or linear streaming system. The statistics may include, for example, the number of times a user identifier has been used to request keys to decrypt the media item and a length of time since the client has requested keys to decrypt the media item.

Based on the generated statistic, the streaming protection system determines whether or not to honor requests for decryption keys needed for the client access to the media item. If the streaming protection system determines that the client is allowed access to the media item, a decryption key that allows decryption of a portion of the media item is transmitted to the client.

In an embodiment, the streaming protection system employs techniques that share some of the functionality of the different streaming techniques discussed above. For example, the streaming protection system may be adapted to use the DASH CE or eHLS techniques. However, the streaming protection system is not limited to only these techniques. The streaming protection system may be adapted to any media item streaming technique that uses encryption that requires delivery of CEK for decrypting the video content. The manifest may be a personalized manifest, including user identification information.

When using a personalized manifest, the manifest provides the key-manager-addresses of key managers from which clients request keys. These key-manager-addresses include additional user identification information that is not needed to identify these key-manager-addresses. For example, user identification information is stored separate from key-manager-address information, so that when determining a key-manager-address for a particular key, the system does not require the user identification portion to determine a key manager's key-manager-address but transmits the user identification portion as part of a request. However, when the request is received at the key manager, the system extracts user identification information from the request. If user authorization is required and the key manager determines that user identification information is missing from the request, the key manager will reject the request.

According to one embodiment, the streaming protection system described herein uses content encryption keys (CEKs) to protect portions of media items while they are in transit and stored on the computer. Different encryption schemes may be used by the streaming protection system, including AES-128 and other encryption schemes. Additionally, the streaming protection system specifies a mechanism for secure delivery of CEKs to the client. The streaming protection system includes cryptographically binding delivery of a CEK to a user's authenticated account identifier. For example, once a user has been authenticated with the system, the system creates a token that is used for stream authorization (e.g., resolving a relative URL to an absolute URL for the video) and is used in CEK requests. The token includes the authentication information (e.g., user account identifier, an indication that the user has been authenticated, a token expiration period). An example of such a mechanism is through the use of a secure_HLS_token used with eHLS. The token used to identify a user may expire based on a certain period of time (key expiration period). The streaming protection system automatically adjusts to when a token expires. CEK requests that are accompanied by non-expired tokens are honored, while CEK requests that are accompanied by expired tokens may be rejected.

Additionally, the streaming protection system controls access to the media items by limiting the key requests it will honor for each token to a rate limit. The rate limit defines, for each user identifier, how frequently the corresponding user can make CEK requests. CEK rate requests that exceed that allowed rate are likely the result of unauthorized users sharing the authorized user's user identifier. The rate limit can be adjusted upwards and downwards, based on different conditions occurring in the streaming protection system. In an embodiment, requesting a new key occurs when the CEK is used to encrypt another portion of the video item. Rotating CEKs is typical content protection practice often used for linear streaming and may be changed as often as every minute.

System Overview

Figure 2:
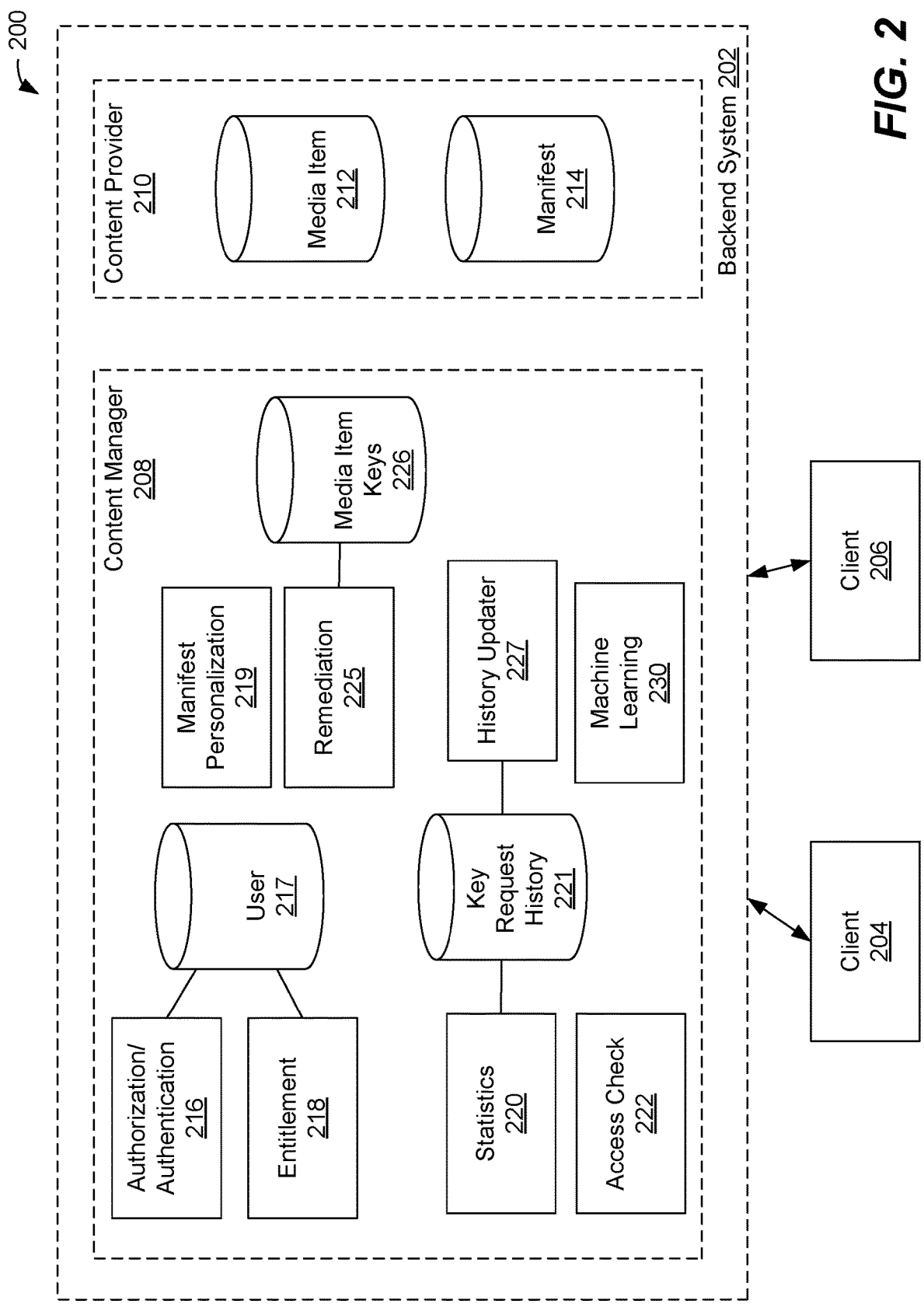
FIG. 2 illustrates an example system in which the techniques described may be practiced according to certain embodiments.

FIG. 2 illustrates an example streaming protection system 200 in which the techniques described may be practiced according to certain embodiments. Streaming protection system 200 is a computer-based system. The various components of streaming protection system 200 are implemented at least partially by hardware at one or more computing devices, such as one or more hardware processors executing instructions stored in one or more memories for performing the various functions described herein. Streaming protection system 200 illustrates only one of many possible arrangements of components configured to perform the functionality described herein. Other arrangements may include fewer or different components, and the division of work between the components may vary depending on the arrangement.

The streaming protection system 200 includes a backend system 202 connected over a network to clients 204 and 206. Although only two clients are shown here, any number of clients may be connected to the backend system 202, depending on the number of users requesting media items from the streaming protection system 200. The backend system 202 includes two different systems, a content manager system 208 and a content provider system 210. These different portions are used to assist in conceptually understanding the different portions of the streaming protection system 200, but alternative implementations of the streaming protection system 200 may arrange and organize different components in each of the portions in other arrangements than the one shown in FIG. 2.

The Content Provider System

The content provider system 210 is responsible for maintaining the media items that users may request in the streaming protection system 200. For example, a media item database 212 stores the media items users may request. For example, although FIG. 2 shows media items stored in the media item database 212, each portion of a media item may be stored on one or more databases, located on different computers. Each portion of a media item may also be stored more than once on one or more databases, so that there are redundant copies of each portion of a media item. The streaming protection system 200 operates with greater efficiency, by selecting the fastest database for a client when a portion is requested. A manifest database 214 stores the manifests for media items stored in media item database 212. Manifests identify where to request the media item portions (as shown in FIG. 1), as well as where to request keys to decrypt each portion of a media item.

The Content Manager System

The content manager system 208 is responsible for controlling access to media items. The content manager system 208 may alternatively be referred to as a key server, entitlement service, license server, rights check service, authentication service, or authorization service. An authorization/authentication component 216 is coupled to a user database 217 to determine whether the clients 204 and 206 are allowed access to the media items stored at the content provider system 210. For example, the streaming protection system 200 checks whether user-provided credentials (e.g., user name, password, two-factor password, and other methods for verifying the identity of persons at the clients) match those of an authorized user of the streaming protection system 200. The authorization/authentication component 216 provides tokens to authenticated devices. These tokens often include an expiration period, so that when the token has expired, another token must be used to authenticate the device again. Authentication with an expired token occurs even if the same user information is provided when renewing the token. The expired user token is replaced with a token containing the same authentication information, although the token itself is different, such as including a new expiration time and new decryption information with the token.

User Authentication

The streaming protection system 200 may use a variety of methods to authenticate a user. In an embodiment, the streaming protection system 200 uses a secure_HLS_token to request CEK's when using Apple Inc.'s eHLS to authenticate identity. The streaming protection system 200 rewrites the manifest using the secure_HLS_token, which assists the streaming protection system 200 in associating the client with the user identifier provided by the client. A secure_HLS_token can only be generated using valid credentials.

An entitlement component 218 determines whether a user credential provided by a particular client is sufficient to access media items requested by that particular client. For example, the entitlement component 218 checks to see if a user is current on their payments for access to media items provided by the streaming protection system 200 (e.g., subscription fees), whether a requested media item is available according to an access level of the user, the subscription tier of the user, the number of concurrent viewers a user account has, the number of devices authorized to access media items of a user account, or any combination of these.

Manifest Personalization

A manifest personalization component 219 takes a generic manifest and adds requestor-id data to the generic manifest to create a personalized manifest. The personalized manifest may include addresses from which the client may retrieve portions of the media item ("portion-addresses") and addresses from which the client may retrieve keys to decrypt the portions ("key-manager-addresses"). As shall be explained in greater detail hereafter, the requestor-id data contained in the personalized manifest is used by clients to identify themselves when the clients request keys. The streaming protection system 200 provides personalized manifests only to authenticated users. According to one embodiment (using Apple Inc.'s eHLS), within the personalized manifest, requestor-id data in the form of a secure_HLS_token is appended to the end of URLs that specify the addresses from which the client is to retrieve keys. For example, a key-manager-address for a first key in a personalized manifest is in a URL format, such as http://keyishere.com/key1/useraccount123. In this example, a client will submit a request to a key provider at http://keyishere.com for a first key. The requestor-id data ("useraccount123") is transmitted to the key provider with the request.

In an embodiment, a token representing a user's credentials is included in the CEK request to a key manager at key-manager-addresses. The personalized manifest including key-manager-addresses is transmitted to a client device, which does not need to be aware that this is a personalized manifest (as opposed to a manifest without user credential information) or how the personalized manifest is created. When the client accesses portions of the media item using the portion-addresses contained in the personalized manifest, the content manager system will be able to determine the user identifier associated with received requests. Additionally, each portion may require a different decryption key, so that any given decryption key may be used to decrypt only one portion of a media item. In an embodiment, the content manager will only respond to requests that include the user's requestor-id.

Maintaining Per-Requestor-id Key-Request Statistics

A statistics component 220 generates statistics used to determine whether access to the media item is allowed. The statistics component 220 uses information stored in a key request history database 221. The key request history database 221 includes historical information, sorted by user account, of how frequently a media item, or portions thereof, has been requested by a specific requestor-id. For example, the statistics component 220 generates statistics. The statistics include how many times keys for a media item have been requested and in what time period, by a specific requestor-id.

In response to key requests, a history updater component 227 updates the key request history database 221. For example, the history updater component 227 updates information stored in the key request history database 221 with information related to different requests (e.g., user identifier, device identifier, media item selected, time of request, or other information).

Protecting Media Based on Key-Request Statistics

An access check component 222 uses information determined from the statistics component to determine whether access is allowed. For example, the streaming protection system 200 determines a maximum rate a user account is allowed request keys for a media item. If the statistics exceeds the maximum rate, the streaming protection system 200 indicates remediation is needed.

A remediation component 225 determines what steps to take based on results of the access check component 222. It may allow access by providing the requested key, deny access by not providing the requested key, or perform other remedial actions. For example, the remediation component may allow access by providing a key to a portion of a media item but issue a warning that a user account associated with the request has potentially been compromised. The remediation component 225 may choose to merely make a record of violations determined by the access check component 222, and allow a certain number of violations before additional remediation occurs. For example, even if the access check component 222 determines a maximum rate of key requests for a particular requestor-id has been exceeded, the remediation component 225 may choose to continue to provide keys to allow access to the media item. However, if the access check component 222 determines that the maximum key-request rate has been exceeded for that same requestor-id one or more additional times, the remediation component 225 may choose any of the additional remediation options available, including denying access to a media item by denying key requests that are associated with that requestor-id.

When remediation actions are taken, the remediation actions may be applied in a variety of ways. For example, when key requests associated with a particular requestor-id exceed a rate threshold, then all subsequent key requests associated with that requestor-id may be denied. On the other hand, statistics may be maintained on a per-requestor-per-media-item basis. In such an embodiment, a particular requestor-id may be in key-request-rate violation relative to one media item, but not relative to others. Thus, when key requests associated with a particular requestor-id for a particular media item exceed a threshold, then all subsequent key requests associated with that requestor-id for that particular media item are denied. However, key requests associated with that requestor-id will still be honored for other media items.

Allowing Access by Providing Decryption Keys

When the remediation component 225 determines to allow access to a media item, it may retrieve a media item key from a media item keys database 226. Keys stored in the media item keys database 226 may be generated dynamically, or determined in advance by the streaming protection system 200.

In an embodiment, a content encryption key (CEK) is transmitted to client devices when they are allowed access to a media item. The CEK is a key that allows viewing of protected content items by decrypting the content item. For example, even though a user may have a copy of a content item stored on their computer, without its corresponding CEK, that content item cannot be accessed.

As explained above, when requesting a CEK, a client device includes its requestor-id along with its request. According to one embodiment, prior to providing the CEK in response to the request, the CEK is "personalized". Specifically, the CEK is encrypted in a manner such that decrypting the CEK requires the authentication token that was provided when the user logged in with that particular requestor-id. Thus, even clients that use the requestor-id of a legitimate user cannot make use of CEKs that are provided to them based on that requestor-id if those clients do not also have the corresponding authentication token do decrypt the CEKs.

Automated Adjustment to Remediation Rules

According to one embodiment, a machine learning component 230 uses information stored by the streaming protection system 200 to adjust when and if remediation is needed. The remediation component 225 may also supply information for use with machine learning algorithms to improve performance or service levels of the streaming protection system 200. For example, channel changing (switching from one media item to another and back) may result in exceeding a maximum rate limit. However, there are technical and practical limitations to how often a user may change from viewing one media item to another. If the streaming protection system 200 determines that, due to channel switching, the maximum rate is being exceeded too often, the streaming protection system 200 may increase the maximum rate.

In an embodiment, the machine learning component 230 recognizes patterns in request history. For example, a pattern may be a geographic pattern. If a user account is frequently used by a client outside of an account user's geographic region, the streaming protection system 200 may flag this as suspicious activity.

Databases 212, 214, 217, 221, and 226 may be any suitable storage device such as one or more hard disk drives, memories, or any other electronic digital data recording device configured to store data. Although the databases are each depicted as a single device in FIG. 2, each database may span multiple devices located in one or more physical key-manager-addresses. For example, the manifest database 214 and media item database 212 may be one or more nodes located at one or more data warehouses. Additionally, in one embodiment, media item keys database 226 may be located on the same device(s) of the content provider system 210.

Statistics

According to one embodiment, rate limiting (protecting media items based on the rate at which keys are requested) is based on statistics generated and maintained by the streaming protection system 200. In one embodiment, those statistics include the rate at which key requests associated with a particular user identifier have been received. The request rate statistics may be maintained on a per-requestor-id basis, a per-requestor-id-per-media-item basis, or a per-requestor-id-per-portion basis.

To generate and maintain the statistics, the streaming protection system 200 records receipt of key requests made by clients. As the rate of requests associated with a user identifier increases, the user identifier's corresponding statistic is increased. Because the statistics are maintained based on requestor-id, key requests that are associated with a first user identifier will not affect the statistics generated by the streaming protection system 200 for key requests that are associated with a second user identifier.

In an embodiment that maintains statistics on a per-requestor-id-per-portion basis, statistics are maintained for each unique user identifier/portion identifier combination. The portion identifier indicates what media item and what portion of the media item that the key request is for. Thus, statistics about key requests, from requestor X, for portion A of media item B are maintained separate from statistics about key requests, from requestor X, for portion B of media item B.

In an embodiment that maintains statistics on a per-requestor-id-per-media-item basis, statistics are maintained only at the user identifier/media item level. Thus, key requests from requestor X for portion A of media item B are recorded and reflected in the same set of statistics as key requests, from requestor X, for portion B of media item B.

Maximum Rate

According to one embodiment, the statistics indicate a current rate of key requests (either on a per-requestor-id, per-requestor-id-per-media-item, or per-requestor-id-per-portion-of-media-item basis). This current key request rate is compared to a maximum rate by the streaming protection system 200 to determine whether a user's account is requesting keys as it normally would, or whether abuse is occurring.

For example, if a key request rate has exceeded the maximum rate, this indicates that abnormal activity has occurred.

The maximum key request rate is not always a fixed rate. For example, in one embodiment, the maximum rate depends on a base rate, which may be adjusted to generate the maximum rate based on different factors considered by the streaming protection system 200. The base rate is a rate stored by streaming protection system 200, indicating how many key requests there should be for a user identifier during a given time period. A non-exhaustive list of factors that may influence how the maximum rate is used by the streaming protection system 200 follow. These factors are divided into different situations, but each factor may be used in conjunction with others, separately, or none at all by the streaming protection system 200 at any given moment.

Situations Where Maximum Rate is Changed

Concurrent Logins on a Single User Account. The streaming protection system 200 may allow for multiple clients to concurrently use the same user account. For example, a video streaming service may allow up to three devices to log into the same account and concurrently stream media items. If concurrent logins are allowed, a maximum key-request rate is increased from the base maximum key-request rate because two or more streaming sessions will be requesting keys more frequently than one streaming session.

Concurrent access to media items by a content provider to a user, in particular with transaction (rental or purchase) or subscription business models, often limit the number of concurrent views per media item. For example, a subscription may include, on a single user identifier, allowing two users to access the streaming protection system 200 simultaneously on a smartphone and a personal computer. Since this would increase the number of key requests received by the streaming protection system 200 (requests from both devices), the maximum key-request rate is increased from a base maximum key-request rate. In an embodiment, the maximum key-request rate is equal to a base maximum key-request rate times the number of allowed concurrent logins. For instance, if a base maximum key-request rate limit is 10 key requests per minute, an account that allows three concurrent logins would have a maximum key-request rate limit of 30 key requests per minute. In other embodiments, the maximum key-request rate is increased by other methods, such as adding a predetermined number to the rate for each allowed concurrent login (e.g., 3, 4, 5 or more additional requests per minute to the base maximum key-request rate for each concurrent login).

Channel Changing. The streaming protection system 200 may allow for a higher maximum key-request rate to accommodate for channel changing. If channel changing is considered, a maximum key-request rate is increased from the base maximum key-request rate. Channel changing is not limited to the traditional television sense, where users go from one television channel to another. Instead, channel switching in a VOD context is when a user switches from a first media item to another media then back to the first media item within a key rotation period. If the user does this, each time the user switches back to a VOD they had previously viewed, their system would request a new key (assuming the client did not retain the CEK that was valid for the next video portions to be viewed). Although channel changing is a legitimate activity, each channel change back to a previously viewed channel increases the user's current key-request rate, which is compared against the maximum key-request rate. However each channel change would appear, from a system perspective, that the same user identifier has requested a key for the same media item within a short period of time (e.g., same key period). Thus, the streaming protection system 200 recognizes that, although the same identifier is used, this is legitimate activity.

Temporary License Changes. The streaming protection system 200 may accommodate temporary changes in a maximum key-request rate for a user identifier. If temporary license changes are considered, a maximum key-request rate is increased from the base maximum key-request rate. For example, the maximum key-request rate could be increased for customers that pay for friends and family access, which allows more concurrent users for a user identifier on a temporary basis. For example, the user's maximum key-request rate may be temporarily increased to accommodate a "pay to share" plan that is for limited time periods (e.g., over the holidays when family is visiting).

Geo Restrictions. The streaming protection system 200 may adjust maximum key-request rates based on where a user's device is. If geo restrictions are considered, a maximum key-request rate may be decreased from the base maximum key-request rate when the requesting device is requesting from certain geographic regions (e.g. countries other than the residence of the authorized requestor), and/or increased in other geographic regions (e.g. the "home state" of the requestor). As another example, some sporting events may be geo-restricted by a content owner. For example, based on where a client is located, this will affect the number of allowed viewers. The user may be able to share with three concurrent users if they are within the allowed geo-range (or out of the restricted range), but have a limit of a single concurrent user if they are outside of the allowed range.

Temporary Media Item Changes. The streaming protection system 200 may temporarily change key-request rate limits for a media item. Specifically, the maximum key-request rate is increased or decreased, depending on the type of change. For example, the streaming protection system 200 may give everyone access to an event (e.g., NFL's Super Bowl, presidential debate, or other) for free as a promotion. During the live steaming of that event on a linear stream, the streaming protection system may significantly increase the maximum key-request rate, or even cease to check for key-request rate violations. The rate limit could also be lifted for a given linear feed (e.g., users viewing a live streaming of a speech). After the feed, then the maximum key-request rate is re-instated.

According to one embodiment, the streaming protection system 200 may be configured to detect when the key-request rate limit is consistently violated by many different requestors. Under these circumstances, the streaming protection system 200 may determine that the maximum key-request rate is too low, thus triggering rate violations in the absence of abuse. To reduce the number of "false positives", the streaming protection system 200 may automatically increase the maximum request-rate under when those conditions occur.

Situations Where Maximum Key-Request Rate is Temporarily Ignored

Temporal. The streaming protection system 200 may choose to ignore rate limits for certain time periods. For example, there may be trial periods or promotional periods. The rate limit could be lifted for the first games in a sporting event playoff series to allow the user to "share" the game with friends, but subsequent playoff games would require either upgrading the account or friends paying for access themselves.

Promotional Access. The streaming protection system 200 may include eliminating rate limits, based on promotions offered by the streaming protection system 200. Promotions may specify specific media items, a time duration, or both. The streaming protection system 200 may allow non-subscribing users access to a media item, to promote the media item or the streaming protection system 200. For example, access to a movie trailer may not include a rate limit, since the movie trailer is used to promote its corresponding movie. In an implementation, the streaming protection system 200 indicates content items with promotional access as a media item that is not associated with a rate limit.

Gated Access. The streaming protection system 200 may allow access, irrespective of whether a user has an account, after viewing an advertisement. A user identifier is generated for the user after the advertisement has completed, the user is automatically temporarily authenticated in the streaming protection system 200 to allow the user to view media items, without requiring the user to explicitly create an account. Accessing without an account may expire after a given length of time, but may be renewed (e.g., viewing another advertisement).

Allowing Maximum Key-Request Rate Violations

Maximum Request-rate Violation. A request-rate violation occurs when the streaming protection system 200 determines that a requestor's rate of key-requests exceeds the determined maximum key-request rate. According to one embodiment, the streaming protection system 200 allows requestors to violate the key-request rate limit, but imposes a cap for the number of request-rate limit violations.

For example, after a request-rate violation, instead of immediately denying the requestor a key, other remedial actions may be taken. For example, for a set number of rate violations, the streaming protection system 200 may choose to still continue to provide keys to the requestor. When providing those keys, the streaming protection system 200 may provide a warning or other indication to the user that their account may be compromised. However, after the key-request rate violations has exceeded the set number of key-request rate violations, further key-requests from that requestor may be denied (thereby preventing the viewing of the media item.

Process Overview

Some specific flows for implementing a technique of an embodiment are presented below, but it should be understood that embodiments are not limited to the specific flows and steps presented. A flow of another embodiment may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular application or based on the data.

User Flow

Figure 3:
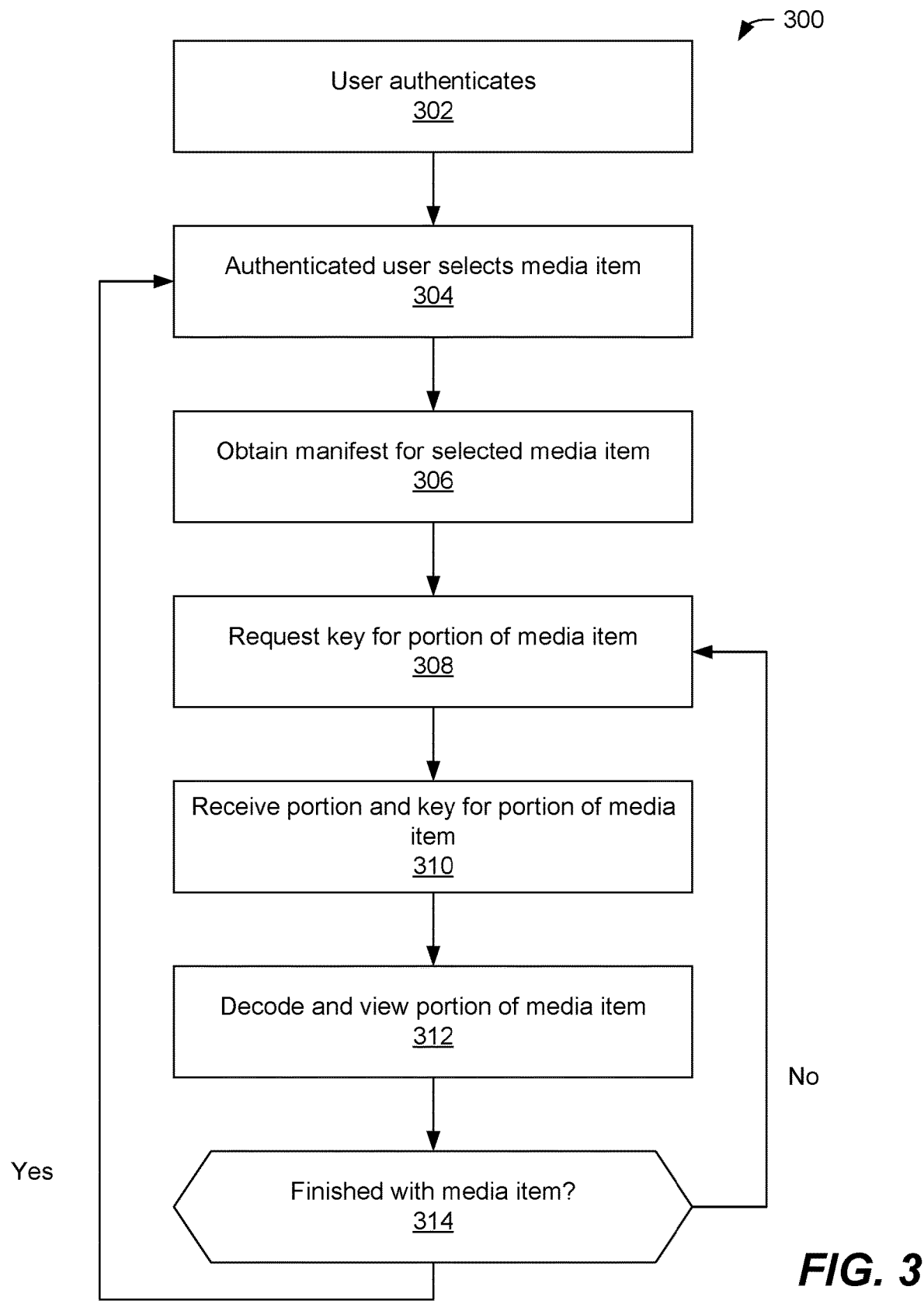
FIG. 3 is a flowchart that depicts an example process for a user accessing a media item in the system.

FIG. 3 is a flowchart that depicts an example process 300 for a user accessing a media item in the streaming protection system 200, in an embodiment. In a step 302, a user authenticates with the streaming protection system 200. Authentication may include providing valid log in credentials, before they are allowed to proceed further with the streaming protection system 200. Other approaches to authentication may also be used. When a user is authenticated, a token may be stored on the user's device identifying the user. The token itself may be encrypted, so that its information is not accessible in a clear text format. In a step 304, the authenticated user selects a media item with the streaming protection system 200. For example, in a VOD system, the user may access a library of one or more media items. The user may view the library and select one or more media items for viewing now (or for viewing later).

In a step 306, if the user has selected the media item for viewing now, the user's device obtains from the streaming protection system 200 a manifest for the selected media item. In a step 308, using the information contained in the manifest, the user requests (a) a portion of the media item, and (b) a key to decrypt the portion of the media item. Generally, the user will want to view the media item from start to finish. However, if the user chooses to do so, they may skip to anywhere in the media item, at any point in viewing the media item.

In a step 310, the user's device receives the key for the portion of the media item from the streaming protection system 200. The user's device also retrieves from the streaming protection system 200 the portion of the media item itself. This may be a section of the media item, playable by the user's device. In a step 312, the user's device decodes the portion of the media item. For example, the key retrieved in step 310 is used to decrypt the key received from the streaming protection system 200.

In a step 314, the streaming protection system 200 determines whether the user is finished with the media item. If the user has not finished viewing the media item but needs to obtain a new portion or a key to a new portion of the media item, control returns to step 308 and the device requests the next portion and/or the key for the next portion of the media item. The next portion is generally a portion of the media item after the one that had just been viewed.

On the other hand, if at step 314 the user has finished viewing the media item, (e.g. the user has reached the end of the media item or has navigated on their device away from the media item), then control returns to step 304, to wait until the user has selected another media item.

Backend Flow

Figure 4:
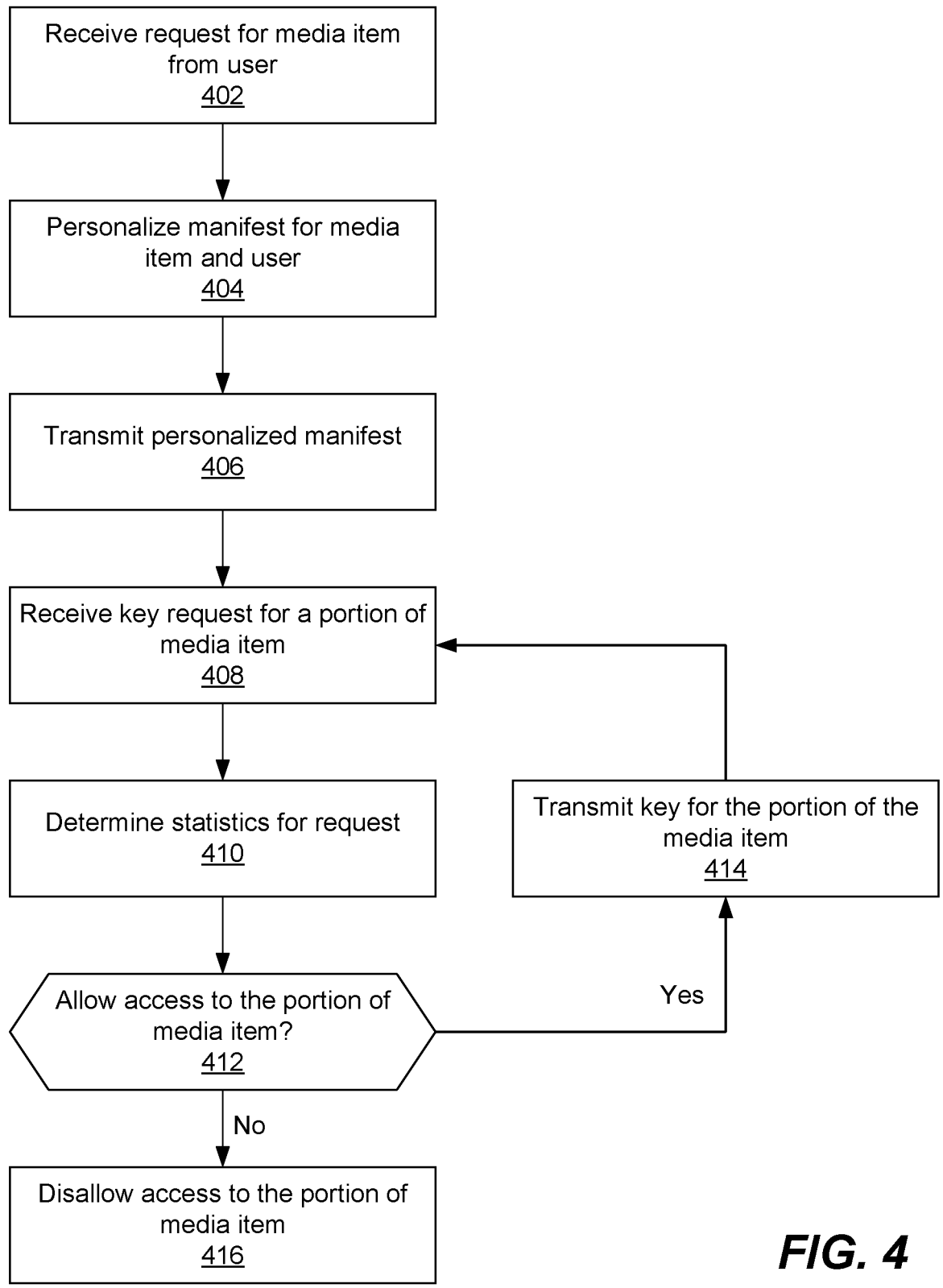
FIG. 4 is a flowchart that depicts an example process for a backend when a user accesses a media item in the system.

FIG. 4 is a flowchart that depicts an example process 400 for a backend when a user accesses a media item in the streaming protection system 200, in an embodiment. In a step 402, the streaming protection system 200 receives a request for media item from a user. The user may be an authenticated user or a user that has obtained credentials of a legitimate user (e.g., login and password, token, or other credentials). Authentication may be provided from the streaming protection system 200 itself, from dependent systems, or from tokens stored on the user's device.

In a step 404, the streaming protection system 200 provides a personalized manifest for the user. The personalized manifest is created by the streaming protection system 200. A manifest includes metadata that records the key-manager-addresses of where keys for a media item are (or where to obtain the keys). The personalized manifest is based on the manifest, but personalized according to a user identifier associated with the user. So, different user identifiers will result in different personalized manifests, even if the requested media item is the same.

In step 406, the streaming protection system 200 transmits the personalized manifest. In an embodiment, the manifest is not encrypted. However, because the manifest is a personalized manifest, the streaming protection system 200 is able to track how many requests for keys are made by a user identifier through the requests generated by a client using the personalized manifest.

In step 408, the streaming protection system 200 receives a key request for key to decrypt a portion of media item. In step 410, the streaming protection system 200 updates its statistics to reflect receipt of the key-request. As mentioned above, statistics may be maintained at various levels of granularity, including but not limited to per-requestor statistics, per-requestor-per-media-item statistics, and per-requestor-per-media-item-per-portion statistics.

In a step 412, the streaming protection system 200 compares the updated statistics with the relevant maximum key-request rate to determine whether to allow access to the portion of media item. Specifically, the requestor's current key-request rate may be compared to the maximum key-request rate determined by the streaming protection system 200.

In a step 414, if access is allowed to the portion of the media item, then the streaming protection system 200 transmits the key for the portion of the media item. The key is used by the requestor's device to decrypt the portion of the media item. In an embodiment, the step 414 may include checking authorization of the user to access the media item based on other entitlement information such as a current subscription account. In a step 416, if the key-request rate limit has been violated, then streaming protection system 200 disallows access to the portion of media item by denying the requested key.

In an embodiment, when used in the linear streaming embodiment as discussed elsewhere, client devices may refresh the manifest for the linear stream more than once. Updated manifests include information that indicates where new portions of the stream and keys are stored.

Other flows of the streaming protection system 200 can include more or fewer steps. For example, the streaming protection system 200 may include authentication steps, not shown in flow 400. In another embodiment, the flows involve reordered steps. For example, step 408 may include two separate steps where receiving the portion of the media item occurs separately from the receiving the key. For example, receiving the key may occur before the step 408 of requesting the key.

Example Implementation with a Content Delivery Network

Figure 5:
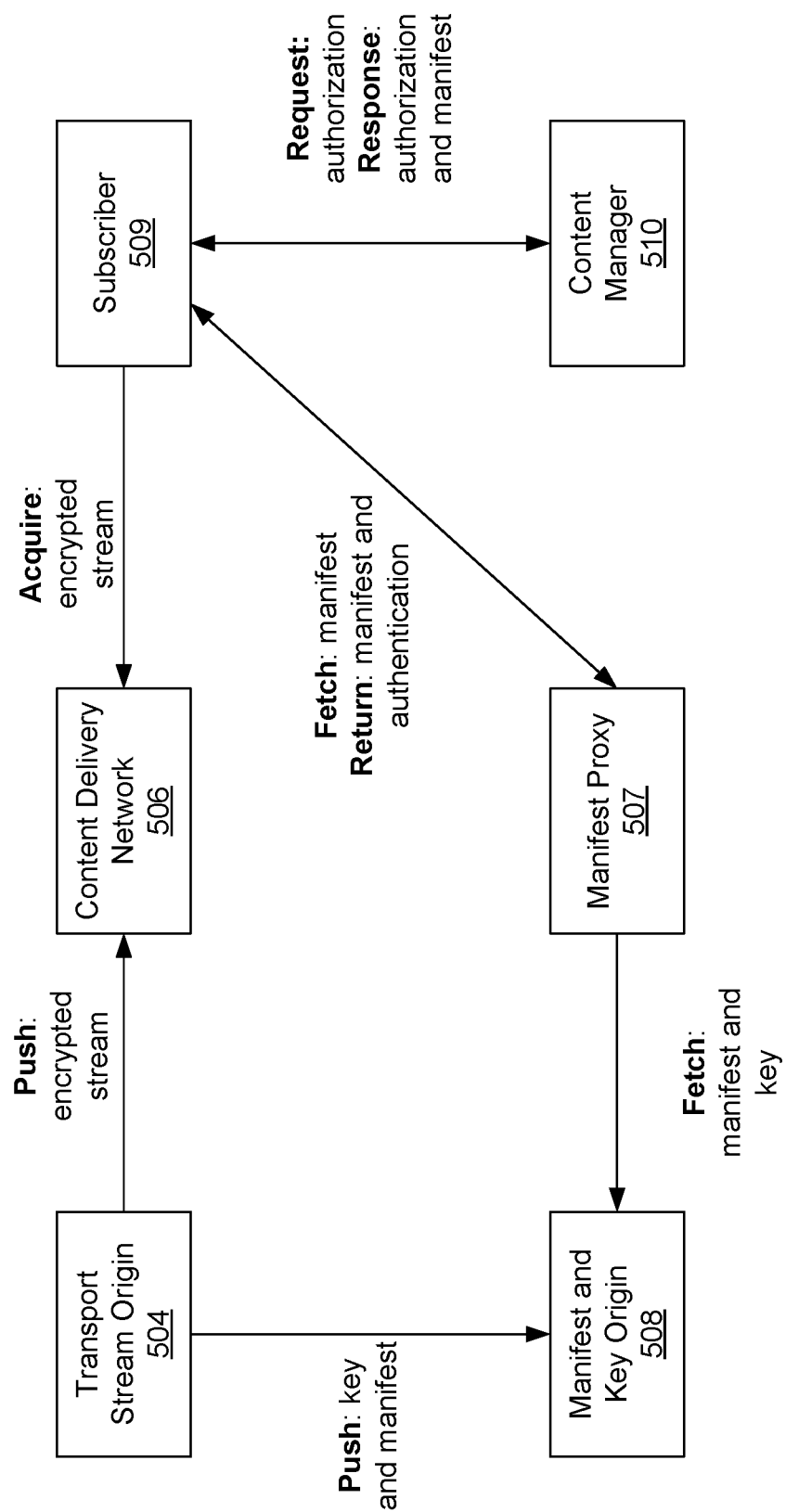
FIG. 5 shows an example implementation of the system incorporating a content delivery network.

FIG. 5 shows an example implementation of the streaming protection system 200 with a content delivery network. A transport stream origin 504 is the source of content (or VOD) in the streaming protection system 200. For example, this may be a database sorting various media items or a source of VOD or linear streams. The transport stream origin 504 is coupled to a content delivery network 506 by an encrypted stream, which is responsible for transferring content to users in the streaming protection system 200. A manifest and key origin 508 is responsible for storing manifests and keys from the transport stream origin 504. A manifest proxy 507 retrieves from the manifest and key origin 508 manifests and keys. The transmission of information between the manifest proxy 507 and the manifest and key origin 508 is encrypted with mutual authentication techniques. This connection may be persistent. Requests made without a proper security certificate or not made over a secure transmission protocol are rejected. The manifest proxy 507 will read the manifest and keys. The manifest proxy 507 uses the streaming protection system 200's public keys to encrypt manifests and modify URL information in the manifest by appending authentication information as a query string parameter.

A subscriber 509 acquires an encrypted stream from the content delivery network 506, as well as manifest and authentication information from manifest proxy 507. In response to an authorization request from subscriber 509, a content manager 510 returns an authorization and a manifest to the subscriber 509. While the subscriber is viewing the media item, the content manager 510 responds to key requests from the subscriber 509. The rate of the key requests is monitored, and remedial action is taken when the key request rate exceeds a maximum allowed rate, as explained above.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
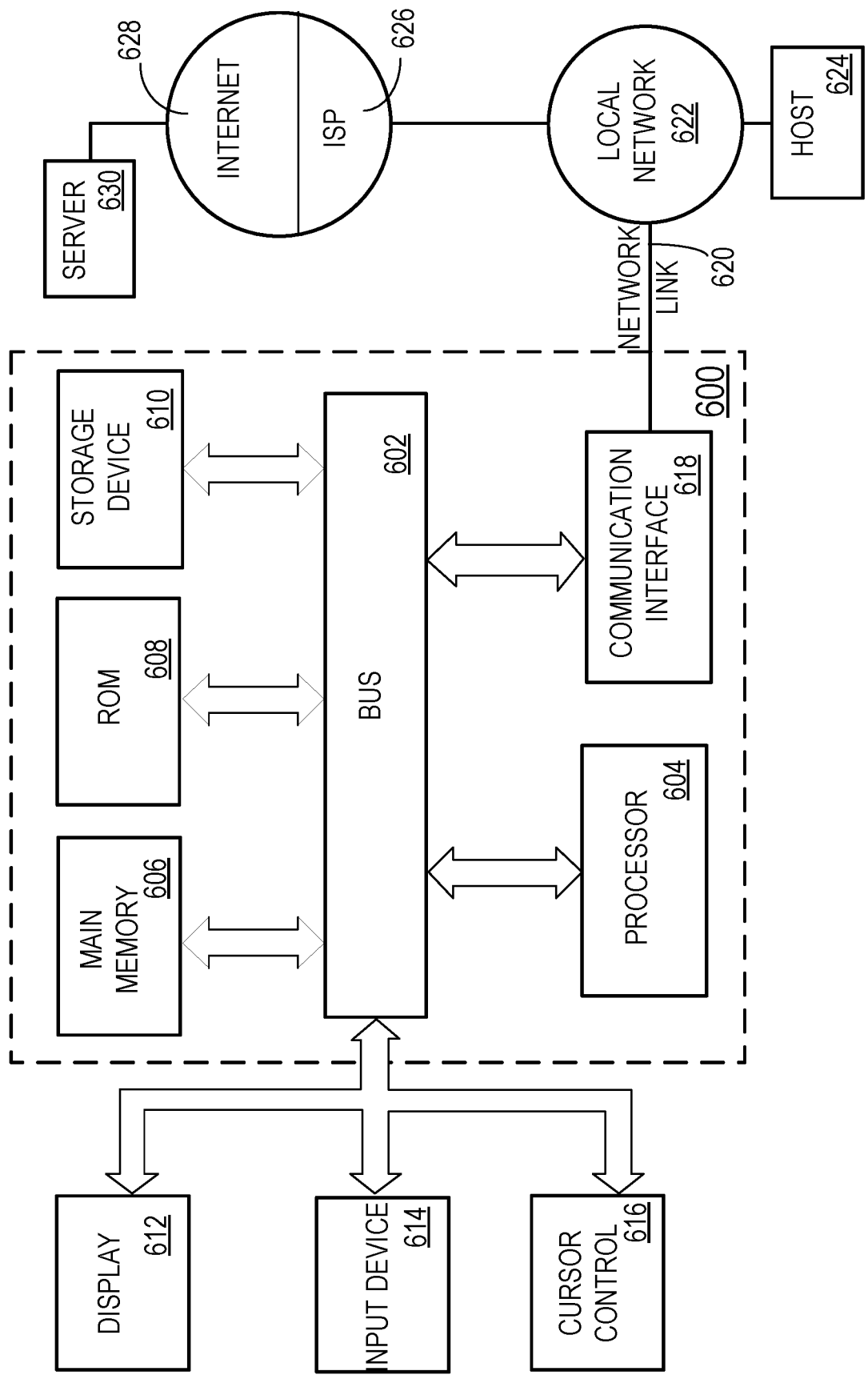
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

maintaining, at a digital key-providing service, a series of digital keys corresponding to a series of portions of streaming media and statistics of digital key requests for each requestor-id of a plurality of requestor-ids, wherein a requester can access a portion of a streaming media item by submitting, to a media server, a key corresponding to the portion of the streaming media item;

receiving from a first client, at the key-providing service, a first key request for a first key needed to play a first portion of a first streaming media item; and in response to receiving the first key request, causing the key-providing service to:

determine that the first key request includes a first requestor-id;

retrieve first statistics maintained for the first requestor-id;

update a current key-request rate associated with the first requestor-id to indicate receipt of the first key request;

based at least in part on the first statistics, determine whether to:

provide the first key to the first client without taking remedial action, or take remedial action;

responsive to determining to provide the first key to the first client without taking remedial action, provide the first key to the first client without taking remedial action; and responsive to determining to take remedial action, take remedial action.

2. The method of claim 1 wherein determining whether to provide the first key to the first client without taking remedial action or take remedial action is at least partly based on a determination that a key request rate limit does not apply during a period of time.

3. The method of claim 1 wherein determining whether to provide the first key to the first client without taking remedial action or take remedial action is at least partly based on a determination that a key request rate limit does not apply to the first streaming media item.

4. The method of claim 1 wherein determining whether to provide the first key to the first client without taking remedial action or taking remedial action is at least partly based on a determination that a key request rate limit does not apply after viewing an advertisement.

5. The method of claim 1 further comprising:
receiving from a second client, at the key-providing service, a second key request for the first key needed to play the first portion of the first streaming media item; and
in response to receiving the second key request, causing the key-providing service to:
determine that the second key request includes the first requestor-id;
retrieve the first statistics maintained for the first requestor-id;
update the current key-request rate to indicate receipt of the second key request;
based at least in part on a comparison of the current key-request rate to a maximum key-request rate, determine whether to:
provide the first key to the second client without taking remedial action, or take remedial action;
responsive to determining to provide the first key to the second client without taking remedial action, provide the first key to the second client without taking remedial action; and
responsive to determining to take remedial action, take remedial action.

6. The method of claim 5 wherein the second key request from the second client is made at approximately the same time as the first key request from the first client.

7. The method of claim 1 wherein taking remedial action comprises denying the first key request.

8. The method of claim 1 wherein:
the first statistics comprise information reflective of the current key-request rate associated with the first requestor-id; and
determining whether to provide the first key to the first client without taking remedial action or taking remedial action is further based on a comparison of the current key-request rate to a maximum key-request rate.

9. The method of claim 8 further comprising dynamically setting the maximum key-request rate based, at least in part, on how many concurrent logins are allowed on an account associated with the first requestor-id.

10. The method of claim 8 further comprising dynamically setting the maximum key-request rate based, at least in part, on detected channel changing.

11. The method of claim 8 further comprising dynamically setting the maximum key-request rate based, at least in part, on a geographic region from which the first key request originates.

12. The method of claim 8 further comprising dynamically setting the maximum key-request rate based, at least in part, on a temporary change applicable to either (a) all requests made in conjunction with the first requestor-id or (b) all requests for the first streaming media item.

13. A key-providing service comprising:
one or more processors operatively coupled to a network;
one or more storage devices operative coupled to the one or more processors;
wherein the one or more processors are programmed to:
maintain statistics of digital key requests on the one or more storage devices for each requestor-id of a plurality of requestor-ids, wherein a requester can access a portion of a streaming media item by submitting to a media server a key corresponding to the portion of the streaming media item;
receive, over the network from a first client, a first key request for a first key needed to play a first portion of a first streaming media item; and
respond to receiving the first key request by:
determining that the first key request includes a first requestor-id;
retrieving first statistics maintained for the first requestor-id;
updating a current key-request rate to indicate receipt of the first key request;
based at least in part on the first statistics, determining whether to:
provide the first key to the first client without taking remedial action, or
take remedial action;
responsive to determining to provide the first key to the first client without taking remedial action, providing the first key over the network to the first client without taking remedial action; and
responsive to determining to take remedial action, taking remedial action.

14. The key-providing service of claim 13 wherein the one or more processors are configured to determine whether to provide the first key to the first client without taking remedial action or take remedial action based on a determination that a key request rate limit does not apply during a period of time.

15. The key-providing service of claim 13 wherein the one or more processors are configured to determine whether to provide the first key to the first client without taking remedial action or take remedial action based on a determination that a key request rate limit does not apply to the first streaming media item.

16. The key-providing service of claim 13 wherein one or more processors are configured to determine whether to provide the first key to the first client without taking remedial action or take remedial action based on a determination that a key request rate limit does not apply after viewing an advertisement.

17. The key-providing service of claim 13 wherein the one or more processors are configured to dynamically set a maximum key-request rate based, at least in part, on how many concurrent logins are allowed on an account associated with the first requestor-id.

18. The key-providing service of claim 13 wherein the one or more processors are configured to dynamically set a maximum key-request rate based, at least in part, on detected channel changing.

19. The key-providing service of claim 13 wherein the one or more processors are configured to dynamically set a maximum key-request rate based, at least in part, on a geographic region from which the first key request originates.

20. The method of claim 13 wherein the one or more processors are configured to dynamically set a maximum key-request rate based, at least in part, on a temporary change applicable to either (a) all requests made in conjunction with the first requestor-id or (b) all requests for the first streaming media item.

\* \* \* \* \*